United States Patent
Sugiyama et al.

(10) Patent No.: US 8,355,341 B2
(45) Date of Patent: Jan. 15, 2013

(54) DELAY TIME MEASUREMENT APPARATUS, STORAGE MEDIUM STORING DELAY TIME MEASUREMENT PROGRAM AND NETWORK SYSTEM

(75) Inventors: Taichi Sugiyama, Kawasaki (JP); Yuji Nomura, Kawasaki (JP); Takeshi Yasuie, Kawasaki (JP); Shunsuke Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 12/888,591

(22) Filed: Sep. 23, 2010

(65) Prior Publication Data

US 2011/0075582 A1    Mar. 31, 2011

(30) Foreign Application Priority Data

Sep. 25, 2009  (JP) .................................. 2009-220643

(51) Int. Cl.
*G06F 11/00*    (2006.01)
(52) U.S. Cl. ......... 370/252; 370/241; 370/250; 709/241
(58) Field of Classification Search .................. 370/241, 370/250, 252; 709/238, 239, 240, 241, 242
See application file for complete search history.

(56) References Cited

U.S. PATENT DOCUMENTS

| 7,936,700 | B2 * | 5/2011 | Yamazaki et al. | ............ 370/252 |
| 2007/0097865 | A1 * | 5/2007 | Song et al. | ..................... 370/235 |
| 2009/0310500 | A1 * | 12/2009 | Matsuda et al. | ............. 370/252 |

FOREIGN PATENT DOCUMENTS

JP        2002-77161 A    3/2002

OTHER PUBLICATIONS

Tachibana, Atsuo et al., "Empirical Study on Locating Congested Segments over the Internet Based on Multiple End-to-End Path Measurements", IEICE Technical Report, vol. 104, No. 309, CQ2004-76 Sep. 2004, pp. 43-48 English Abstract.

* cited by examiner

*Primary Examiner* — Chi Pham
*Assistant Examiner* — Weibin Huang
(74) *Attorney, Agent, or Firm* — Fujitsu Patent Center (57) ABSTRACT

A CPU executes a process including determining a core node among plural relay nodes on a basis of route information, acquiring a first and a second packets flowing between a server and a terminal apparatus, the second packet being transmitted on a basis of the first packet, calculating a first delay time on a basis of the first and the second packets, the first delay time relating to packet transmission between the server and the terminal apparatus, transmitting a third packet to the core node, receiving a response to the third packet from the core node, calculating a second delay time on a basis of the third packet and the response, the second delay time being a delay time of the core node, and calculating a third delay time being a delay time of an end node on a basis of the first and the second delay times.

15 Claims, 12 Drawing Sheets

FIG. 3

| ROUTE INFORMATION | |
|---|---|
| FLOW | PASSAGE ROUTE |
| F1 | SUBNET A, N2, N1, SERVER |
| F2 | SUBNET B, N3, N1, SERVER |
| ... | ... |

FIG. 4

| NODE INFORMATION | |
|---|---|
| NODE | NODE TYPE |
| N1 | 1 |
| N2 | 0 |
| N3 | 0 |
| ... | ... |

FIG. 5

| DELAY TIME INFORMATION | | |
|---|---|---|
| TRANSMISSION SOURCE | IP ADDRESS | DELAY TIME |
| SUBNET A | 10.10.10.10 | 20 [msec] |
| SUBNET A | 10.10.10.20 | 21 [msec] |
| SUBNET B | 20.20.20.10 | 999 [msec] |
| SUBNET B | 20.20.20.20 | 1000 [msec] |
| SUBNET B | 20.20.20.30 | 1001 [msec] |
| ... | ... | ... |

FIG. 6

| DELAY ELEMENT INFORMATION |||
|---|---|---|
| ID | DELAY ELEMENT | DELAY TIME |
| 0001 | β1 | 10.2610 [msec] |
| | β2 | 10.1551 [msec] |
| | β3 | 993.2656 [msec] |
| 0002 | β1 | 10.2730 [msec] |
| | β2 | 15.5471 [msec] |
| | β3 | 993.3008 [msec] |
| ... | ... | ... |

N1
$\begin{cases} y1 = 10.07912 = \beta 1 \\ y1 = 10.47883 = \beta 1 \\ y1 = 10.22502 = \beta 1 \end{cases}$ F1
$\begin{cases} y2 = 20.38406 = \beta 1 + \beta 2 \\ y2 = 20.05178 = \beta 1 + \beta 2 \\ y2 = 20.38983 = \beta 1 + \beta 2 \\ y2 = 20.96867 = \beta 1 + \beta 2 \\ y2 = 20.28595 = \beta 1 + \beta 2 \end{cases}$ F2
$\begin{cases} y3 = 1004.505 = \beta 1 + \beta 3 \\ y3 = 1002.188 = \beta 1 + \beta 3 \\ y3 = 1004.306 = \beta 1 + \beta 3 \\ y3 = 1002.233 = \beta 1 + \beta 3 \\ y3 = 1004.401 = \beta 1 + \beta 3 \end{cases}$ $\begin{cases} \beta 1 = 10.2610 \\ \beta 2 = 10.1551 \\ \beta 3 = 993.2656 \end{cases}$

DELAY TIME MEASUREMENT APPARATUS, STORAGE MEDIUM STORING DELAY TIME MEASUREMENT PROGRAM AND NETWORK SYSTEM

CROSS-REFERENCE TO RELATED APPLICATIONS

This application is based upon and claims the benefit of priority of the prior Japanese Patent Application No. 2009-220643, filed on Sep. 25, 2009, the entire contents of which are incorporated herein by reference.

FIELD

The embodiment relates to a delay time measurement apparatus, a storage storing a delay time measurement program and a network system.

BACKGROUND

Figure 15:
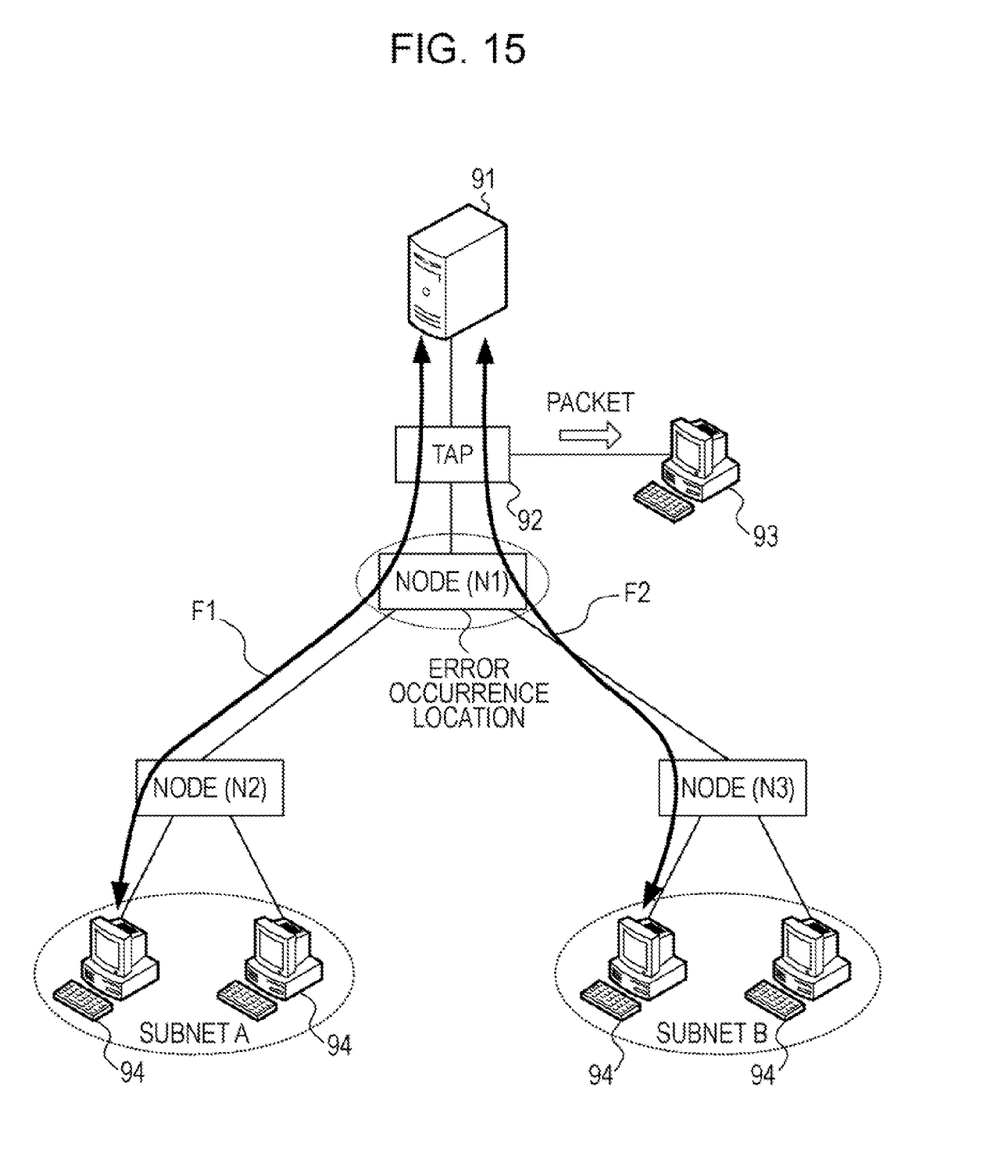
FIG. 15 illustrates a network system subjected to the network tomography analysis.

It is widely known that the importance of technologies for specifying the irregular location occurring in a network has been increased with an increase in each of the complication and the diversification of network configurations. As one of the above-described technologies, the network tomography analysis performed to analyze the irregular location occurring in a network based on information illustrating the quality of a measured flow of a packet exchanged between ends has been available. Hereinafter, the network tomography analysis will be described. FIG. 15 illustrates a network system subjected to the network tomography analysis.

The network system illustrated in FIG. 15 includes a server 91, a plurality of terminal apparatuses 94 connected to the server 91 via a network, a tap 92, and a monitoring apparatus 93. In the network, the tap 92 can acquire the entire data exchanged between the server 91 and the terminal apparatuses 94. The monitoring apparatus 93 acquires a packet provided as data exchanged within the network system via the tap 92. The server 91 and the terminal apparatuses 94 are connected to one another via nodes. In FIG. 15, a core node is designated by the reference numeral N1, a network achieved through a node N2 connected to the core node N1 is determined to be a subnet A, and a network achieved through a node N3 which is connected to the core node N1 and is different from the node N2 is determined to be a subnet B. Here, the term "core node" will be described. When the network is regarded as a tree structure, only a node is connected to the lower link of the core node. Each of the above-described terminal apparatuses 94 belongs to either of the subnets A and B. The flow of data transmitted from the server 91 to the terminal apparatus 94 belonging to the subnet A is determined to be a flow F1, and that of data transmitted from the server 91 to the terminal apparatus 94 belonging to the subnet B is determined be a flow F2.

In the above-described network system, the monitoring apparatus 93 calculates variations in a delay time relating to the data exchange for each of the flows F1 and F2 based on the packet acquired via the tap 92. Next, the monitoring apparatus 93 determines whether or not an irregularity occurs in each of the flows F1 and F2 based on a threshold value and the variations in the delay time. Here, the threshold value is the variation rate determined for each of the flows F1 and F2, and when the value of the variation rate of the delay time is equivalent to and/or larger than the determined threshold value, it is determined that the irregularity occurs in the corresponding flow. For example, when the delay time of the flow F1 is changed from 20 ms to 40 ms and the threshold value is 200%, it is determined that the irregularity occurs in the flow F1. When the delay time of the flow F2 is changed from 1000 ms to 1020 ms and the threshold value is 101%, it is determined that the irregularity occurs in the flow F2.

Next, the monitoring apparatus 93 maps regular/irregular information for a node via which the flow passes based on the above-described determinations. The regular/irregular information illustrates whether or not the flow is regular. After the mapping is performed, the monitoring apparatus 93 determines the set of nodes covering an irregular flow by the minimum number of nodes to be the irregular location. For example, when each of the flows F1 and F2 is determined to be the irregular flow as described above, the core node N1 covering the flows F1 and F2 is specified as the irregular location. During the irregular location specification, a node covering a regular flow is excluded.

For example, "Empirical Study on Locating Congested Segments over the Internet Based on Multiple End-to-End Path Measurements", IEICE Technical Report, vol. 104, no. 309, CQ2004-76, pp. 43-48, September 2004. has been disclosed as one the above-described technologies for specifying the irregular location in the network.

However, it has often been difficult to specify the irregular location with precision according to the above-described technologies for specifying the irregular location. When the threshold value provided to determine whether or not an irregularity occurs in the flow is low, the flow is determined to be regular even though the flow should be determined to be irregular. For example, when the threshold value set for the flow F2 is 110% in the above-described network system, the flow F2 is not determined to be the irregular flow. As a result, only the flow F1 is determined to be the irregular flow. Since the core node N1 covers the flow F2, only the node N2 is determined to be the irregular location, because the delay time is measured in flows. Further, since the delay time is measured in nodes, a heavy load is put on the network when all of the nodes are monitored.

SUMMARY

According to an aspect of an embodiment, a delay time measurement apparatus includes a storage to store route information which indicates a connection route between a server and a terminal apparatus connected to the server via a plurality of relay nodes, and a central processing unit to execute a process including determining a core node among the relay nodes on a basis of the route information, the core node being connected to the terminal apparatus via an end node being the relay node next to the terminal apparatus, acquiring a first packet and a second packet flowing between the server and the terminal apparatus, the second packet being transmitted on a basis of the first packet, calculating a first delay time on a basis of the first packet and the second packet, the first delay time relating to packet transmission between the server and the terminal apparatus, transmitting a third packet to the core node, receiving a response to the third packet from the core node, calculating a second delay time on a basis of the third packet and the response, the second delay time being a delay time of the core node, and calculating a third delay time on a basis of the first delay time and the second delay time, the third delay time being a delay time of the end node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First, a network system according to an embodiment and the hardware configuration of a delay time-measurement apparatus will be described with reference to FIG. 1.

Figure 1:
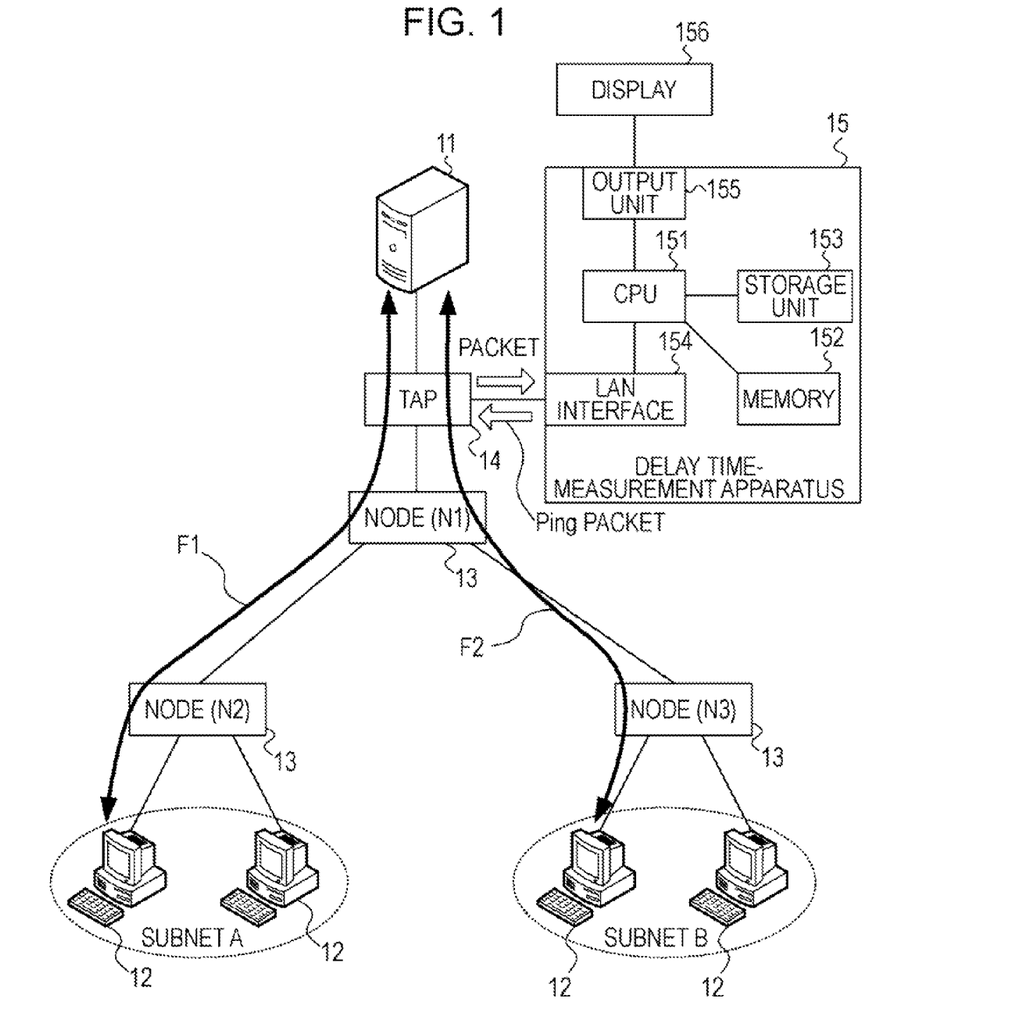
FIG. 1 illustrates a network system according to an embodiment and the hardware configuration of a delay time-measurement apparatus.

As illustrated in FIG. 1, the network system according to the embodiment includes a server 11, at least one terminal apparatus 12, at least one node 13, a tap 14, and a delay time-measurement apparatus 15. The server 11 determines the terminal apparatus 12 to be a client, and transmits and/or receives data to and/or from the terminal apparatus 12 via a network. Each of the nodes 13, which is provided as a relay node, is configured to relay the connection established between the server 11 and the terminal apparatus 12. In the above-described embodiment, a plurality of the nodes 13 is provided. Namely, the node 13 connected to the server 11 via the tap 14 is determined be a node N1, the two nodes 13 that are connected to the node N1 are respectively determined to be nodes N2 and N3, a network connected to the node N2 is determined to be a subnet A, and a network connected to the node N3 is determined to be a subnet B. A plurality of the terminal apparatuses 12 transmits and/or receives data to and/or from the server 11. Each of the terminal apparatuses 12 is connected to either of the nodes N2 and N3. The delay time-measurement apparatus 15 is connected to the network via the tap 14 provided between the server 11 and the node N1, and transmits and/or receives a packet exchanged between the server 11 and the terminal apparatuses 12. In the above-described embodiment, the flow of data transmitted from the server 11 to the subnet A is determined to be a flow F1, and that of data transmitted from the server 11 to the subnet B is determined to be a flow F2.

The delay time-measurement apparatus 15 includes a central processing unit (CPU) 151, a memory 152, a storage unit 153, a local area network (LAN)-interface 154, and an output unit 155. The output unit 155 is connected to a display 156. The storage unit 153 is, for example, an involatile storage medium including a hard disk, a flash memory, and so forth.

Figure 2:
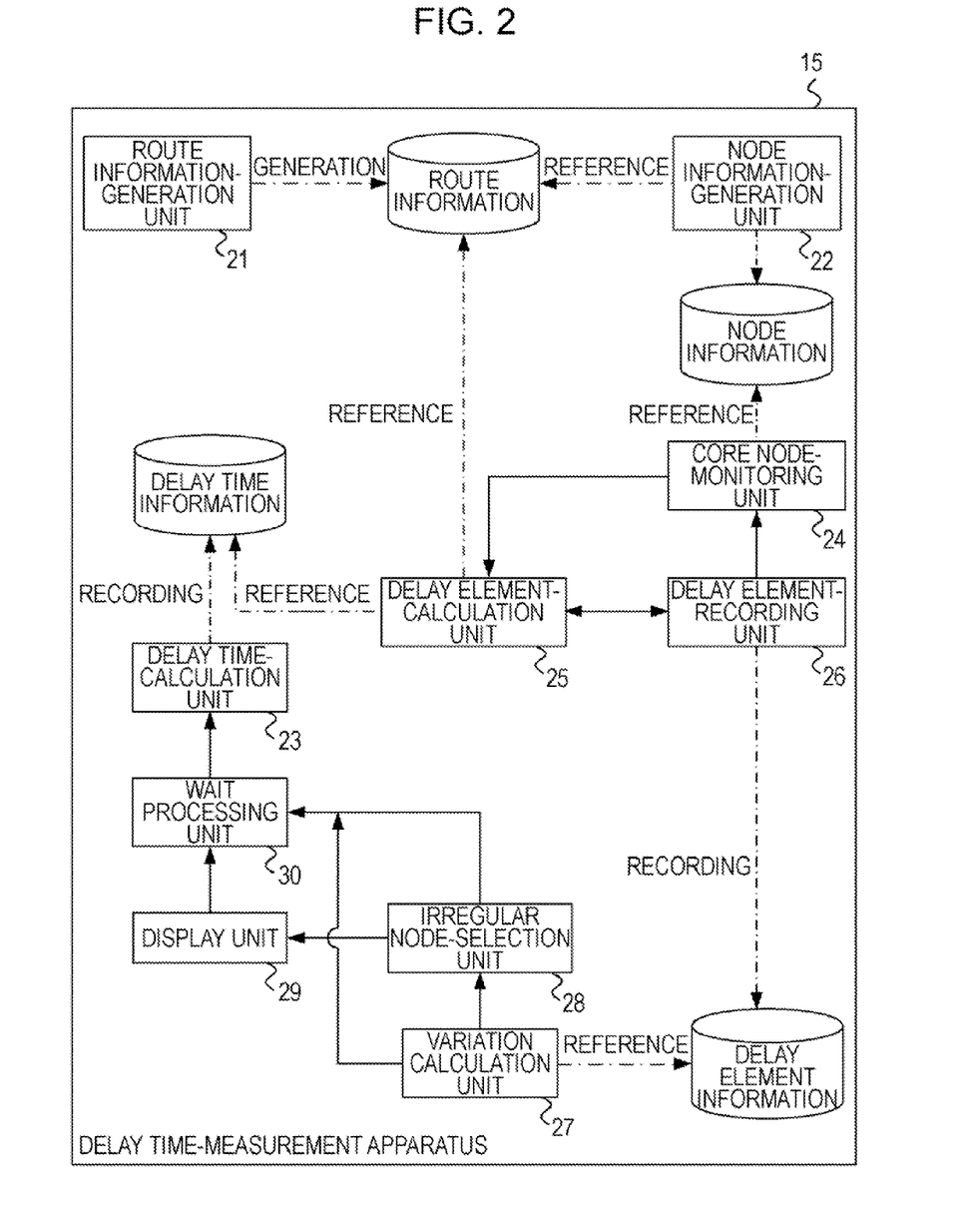
FIG. 2 illustrates the functional configuration of the delay time-measurement apparatus.
Figure 3:
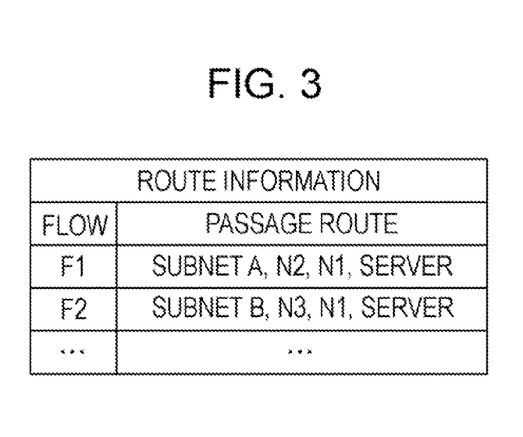
FIG. 3 illustrates route information.
Figure 4:
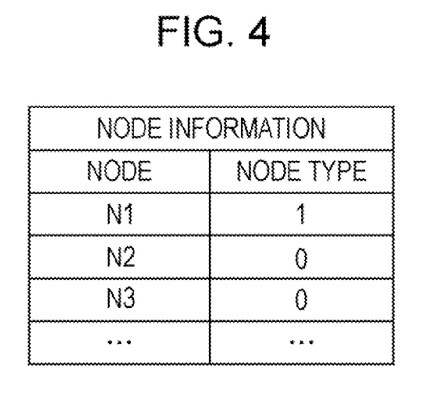
FIG. 4 illustrates node information.
Figure 5:
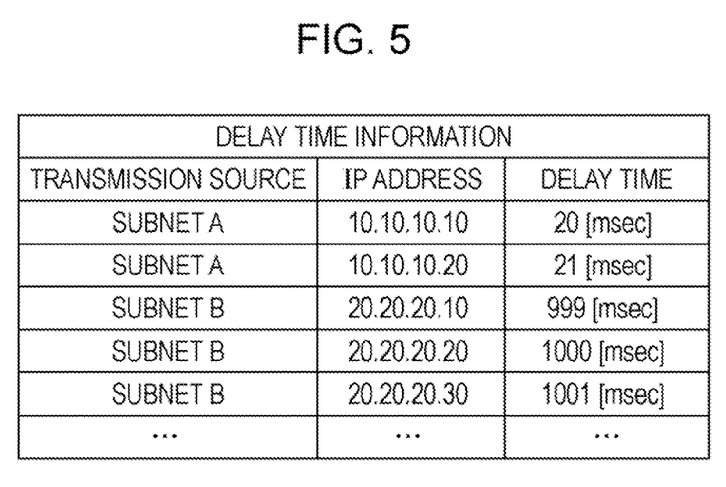
FIG. 5 illustrates delay time information.
Figure 6:
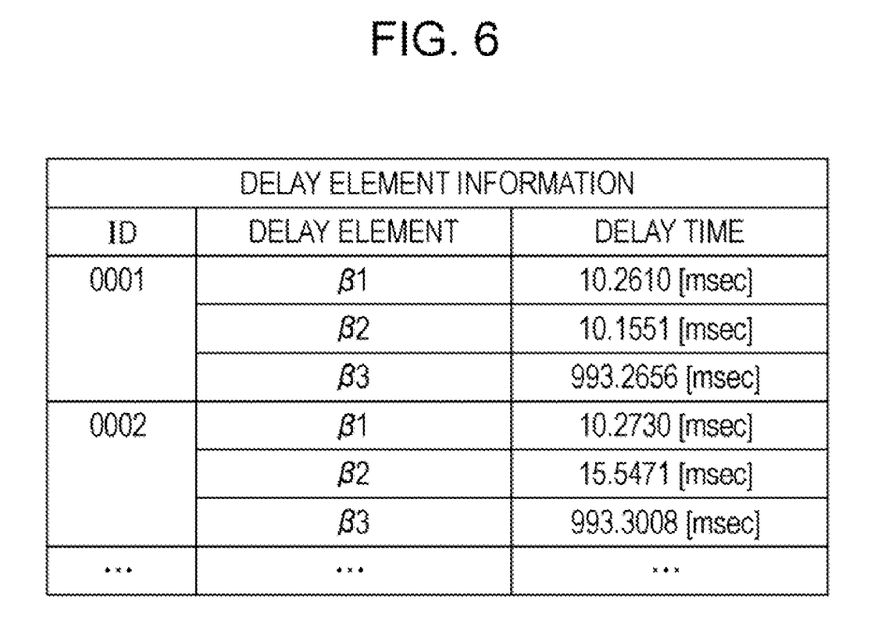
FIG. 6 illustrates delay element information.

Next, the functional configuration of the delay time-measurement apparatus 15 will be described. FIG. 2 illustrates the functional configuration of the delay time-measurement apparatus 15. FIG. 3 illustrates route information. FIG. 4 illustrates node information. FIG. 5 illustrates delay time information. Further, FIG. 6 illustrates delay element information.

As illustrated in FIG. 2, the delay time-measurement apparatus 15 includes a route information-generation unit 21, a node information-generation unit 22 functioning as a core node-determining unit, a delay time-calculation unit 23 functioning as an acquisition unit and a first delay time-calculation unit, a core node-monitoring unit 24 functioning as a transmission unit, a reception unit, and a second delay time-calculation unit, a delay element-calculation unit 25 functioning as a third delay time-calculation unit, a delay element-recording unit 26 functioning as a third delay time-storage unit, a second determination unit, and a subtraction unit, a variation calculation unit 27, an irregular node-selection unit 28 functioning as a first determination unit and a selection unit, a display unit 29, and a wait processing unit 30, as functions. Each of the above-described functions is achieved through the CPU 151 and the memory 152 that are cooperating with each other. Further, the delay time-measurement apparatus 15 stores the route information, the node information, the delay time information, and the delay element information in the storage unit 153.

The route information is used to associate the flow of the data transmitted from the server 11 to each of the subnets A and B with the passage route of the data, as illustrated in FIG. 3. For example, the flow F1 is illustrated as a route extending from the subnet A to the server 11 via the nodes N2 and N1. The node information is used to associate each node with the type thereof. The node information indicates that the node 13 corresponding to the node type 1 is a core node and the node 13 corresponding to the node type 0 is an edge node. In the above-described embodiment, the node 13 connected to the terminal apparatus 12 provided as an end node via a different node 13 is determined to be the core node, and the node 13 which is directly connected to the terminal apparatus 12 is determined to be the edge node. The delay time information is used to associate the subnet provided as the transmission source of a packet, the IP address of the terminal apparatus 12 of the transmission source, and the delay time observed in the flow of the transmitted packet with one another, as illustrated in FIG. 5. The delay element information is used to associate an ID, a delay element, and the delay time of the delay element with one another, as illustrated in FIG. 6. The delay element is one of delay times that are obtained through dividing the delay time observed in the flow by the nodes Ni, and the delay element corresponding to each of the nodes Ni is illustrated as a delay element βi. The delay time illustrated in the delay element information is illustrated as a delay element. Namely, the delay time illustrated in the delay element information is different from that illustrated in the delay time information. Further, the delay time of each of the delay elements of the network system according to the above-described embodiment is associated with a single ID. Since the delay time of the delay element is calculated at regular time intervals and is provided with an ID which is counted up once every calculation, the ID illustrated in the delay element information indicates a time series. Hereinafter, the delay time of the delay element is simply referred to as a "delay element".

The route information-generation unit 21 issues a command such as the traceroute command, refers to a routing table provided in the node 13, and analyzes data of a dynamic routing protocol, the data flowing through the network, such as Open Shortest Path First (OSPF), for example, to acquire the route of each of the flows and generate the route information. The route information-generation unit 21 may use any means as the method of acquiring the route. The node information-generation unit 22 refers to the route information and generates the node information based on the route information. The delay time-calculation unit 23 calculates the delay time of a packet flowing from each of the terminal apparatuses 12 to the server 11 and stores information about the delay time as the delay time information. The core node-monitoring unit 24 refers to the node information, issues the Ping command to the core node based on the node information, and calculates the delay time of the core node. The delay element-calculation unit 25 calculates the delay element based on the delay time information. The delay element-recording unit 26 determines whether or not the value of the delay element calculated through the delay element-calculation unit 25 is negative. When the delay element value is not negative, the delay element-recording unit 26 records and adds information about the delay element to the delay element information. The variation calculation unit 27 refers to the delay element information and calculates variations in each of the delay elements of the delay element information based on the delay elements with different time series. The irregular node-selection unit 28 selects an irregular node based on the calculated variations in the delay element. The display unit 29 displays information about the irregular node selected through the irregular node-selection unit 28 on the display 156 via the output unit 155. The wait processing unit 30 waits a predetermined time so that each of the delay time-calculation unit 23 and the core node-monitoring unit 24 periodically acquires a packet and calculates the delay time.

Figure 8:
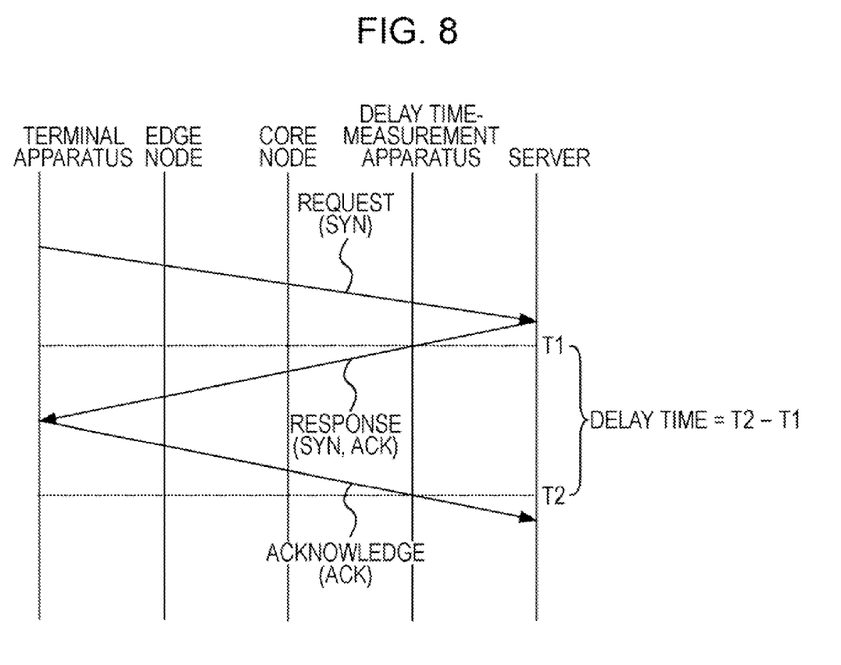
FIG. 8 illustrates the method of calculating a delay time.
Figure 9:
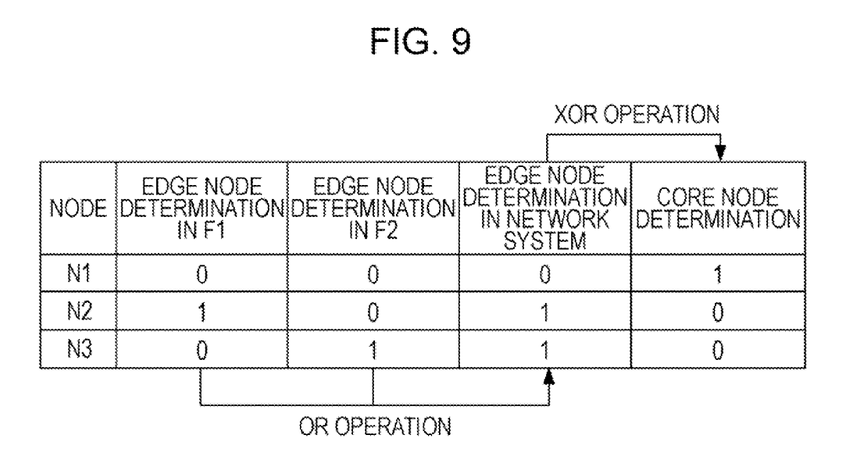
FIG. 9 illustrates the method of determining the node type.

Next, the operation of the delay time-measurement apparatus 15 will be described with reference to FIG. 7. Further, FIG. 8 illustrates the method of calculating the delay time, and FIG. 9 illustrates the method of determining the node type.

Figure 7:
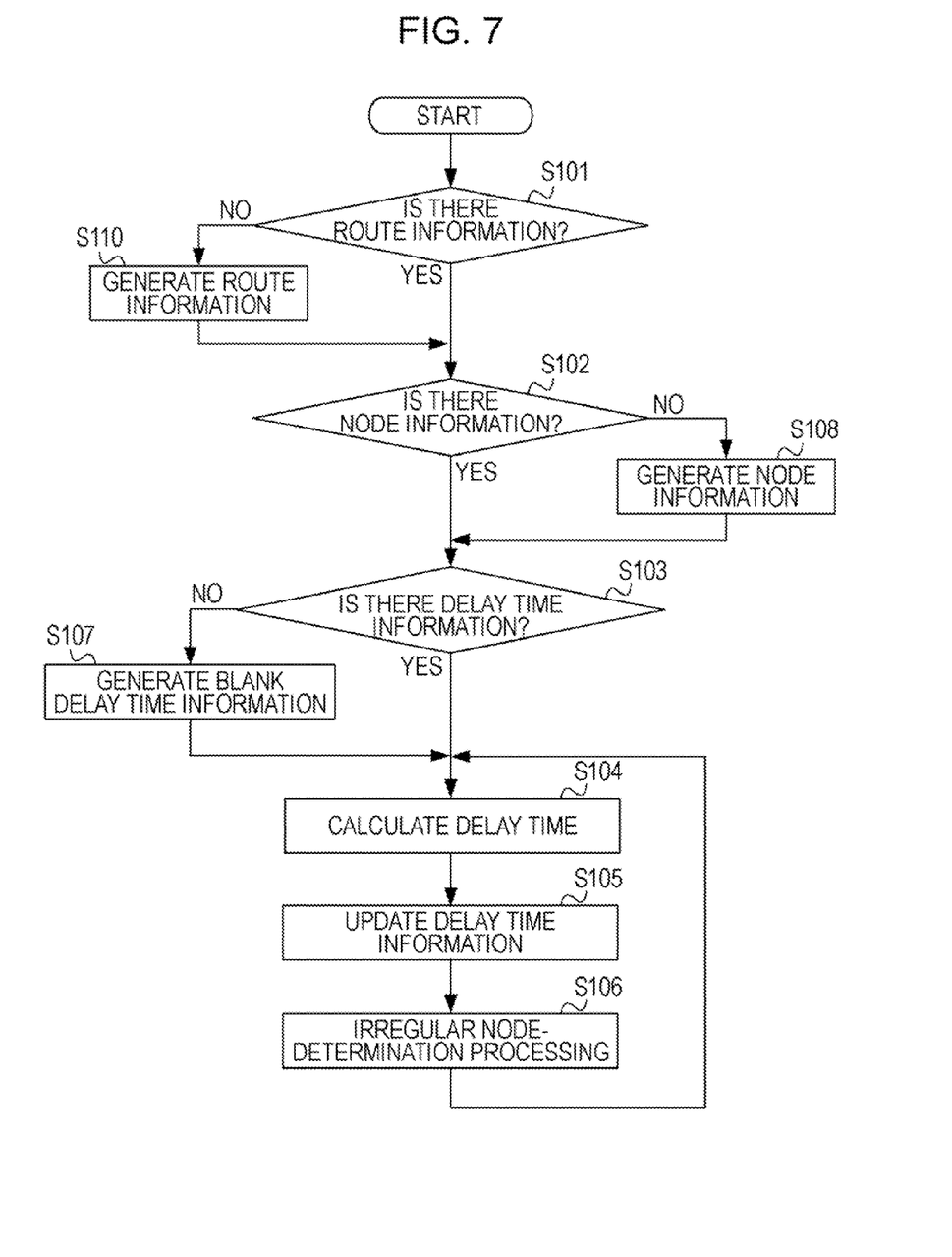
FIG. 7 is a flowchart illustrating the operation of the delay time-measurement apparatus.

First, the route information-generation unit 21 determines whether or not the route information is stored in the storage unit 153 at step S101, as illustrated in FIG. 7.

When the route information is stored in the storage unit 153, which means that the answer is YES at step S101, the node information-generation unit 22 determines whether or not the node information is stored in the storage unit 153 at step S102.

When the node information is stored in the storage unit 153, which means that the answer is YES at step S102, the delay time-calculation unit 23 determines whether or not the delay time information is stored in the storage unit 153 at step S103.

When the delay time information is stored in the storage unit 153, which means that the answer is YES at step S103, the delay time-calculation unit 23 acquires a packet exchanged between the server 11 and each of the subnets A and B, and calculates the delay time based on the acquired packet at step S104. Here, the method of calculating the delay time will be described. As illustrated in FIG. 8, the time when the delay time-calculation unit 23 acquires a response packet transmitted from the server 11 for a request packet transmitted from the terminal apparatus 12 is determined to be time T1. Further, the time when the delay time-calculation unit 23 acquires a confirmation packet transmitted from the terminal apparatus 12 for the response packet is determined to be time T2. In that case, the delay time-calculation unit 23 determines a time difference between the time T1 and the time T2 to be the delay time. More specifically, the delay time-calculation unit 23 determines a value obtained by subtracting the time T1 from the time T2 to be the delay time. Further, the delay time-calculation unit 23 acquires a packet transmitted and/or received within a predetermined sampling time, and calculates the above-described delay time for every transmission and/or reception of the acquired packet, the transmission and/or the reception being performed between the server 11 and each of the subnets A and B.

After calculating the delay time, the delay time-calculation unit 23 updates the delay time information based on the calculated delay time at step S105. Here, the delay time-calculation unit 23 associates the subnet to which the terminal apparatus 12 belongs with the calculated delay time, where the terminal apparatus 12 had transmitted the request packet in the flow where the delay time is calculated. Then, the delay time-calculation unit 23 records and adds information about the subnet and the calculated delay time to the delay time information. In the above-described embodiment, the delay time calculation is performed for the flow of a packet exchanged between the server 11 and the subnet. Therefore, a plurality of delay times occurring between different terminal apparatuses 12 and the server 11 is handled as the delay time of the same subnet when the different terminal apparatuses 12 belong to the same subnet.

Next, the core node-monitoring unit 24 executes irregular node-determination processing that will be described later, at step S106, and the delay time-calculation unit 23 acquires a packet and calculates the delay time at step S104 again.

Further, when the determination made at step S103 indicates that no delay time information is stored in the storage unit 153, which means that the answer is NO at step S103, the delay time-calculation unit 23 generates blank delay time information at step S107.

Further, when the determination made at step S102 indicates that no node information is stored in the storage unit 153, which means that the answer is NO at step S102, the node information-generation unit 22 determines the node type based on the route information and generates node information including information about each node and the determination result thereof that are associated with each other at step S108. Here, the method of determining the node type will be descried. As illustrated in FIG. 9, the node information-generation unit 22 determines whether or not each node is an edge node in each flow based on the route information. In the flow F1, for example, the node N2 is determined to be the edge node, because the node N2 is adjacent to the subnet A. A combination of one of the flows and one of the nodes is assigned 1 by the node information-generation unit 22 when the node is determined to be the edge node. If the node is not determined to be the edge node, the combination is assigned 0 by the node information-generation unit 22. After the assignment is done, the node information-generation unit 22 performs the OR operation between different flows for each node so that the edge node determination for the network system is performed. Further, the node information-generation unit 22 determines the node corresponding to a result of the XOR operation performed for the result of the edge node determination performed for the network system, where the value of the result is 1, to be a core node. When the value of the result of the XOR operation is 0, the node information-generation unit 22 determines the node to be a node other than the core node.

Further, when it is determined, at step S101, that no route information is stored in the storage unit 153, which means that the answer is NO at step S101, the route information-generation unit 21 generates the route information at step S110.

Figure 11:
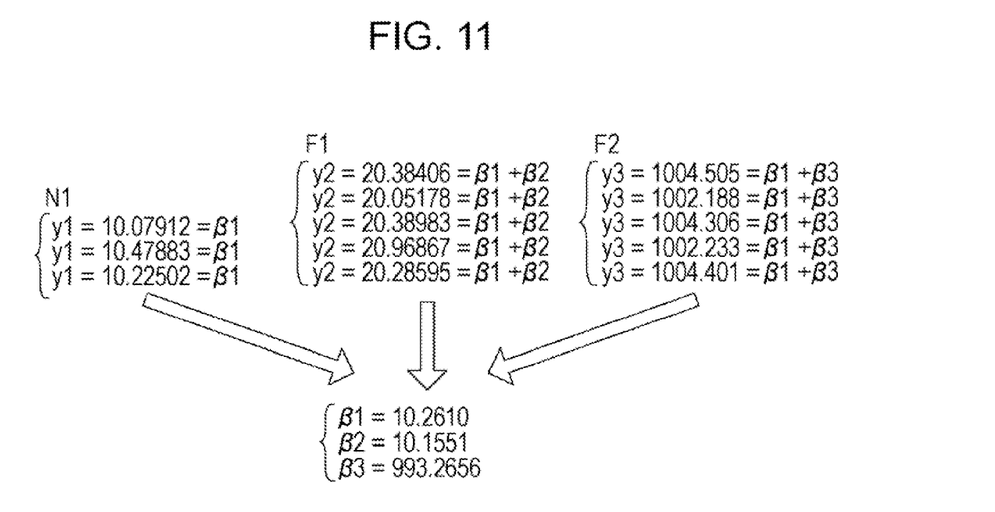
FIG. 11 illustrates the method of calculating delay elements.
Figure 12:
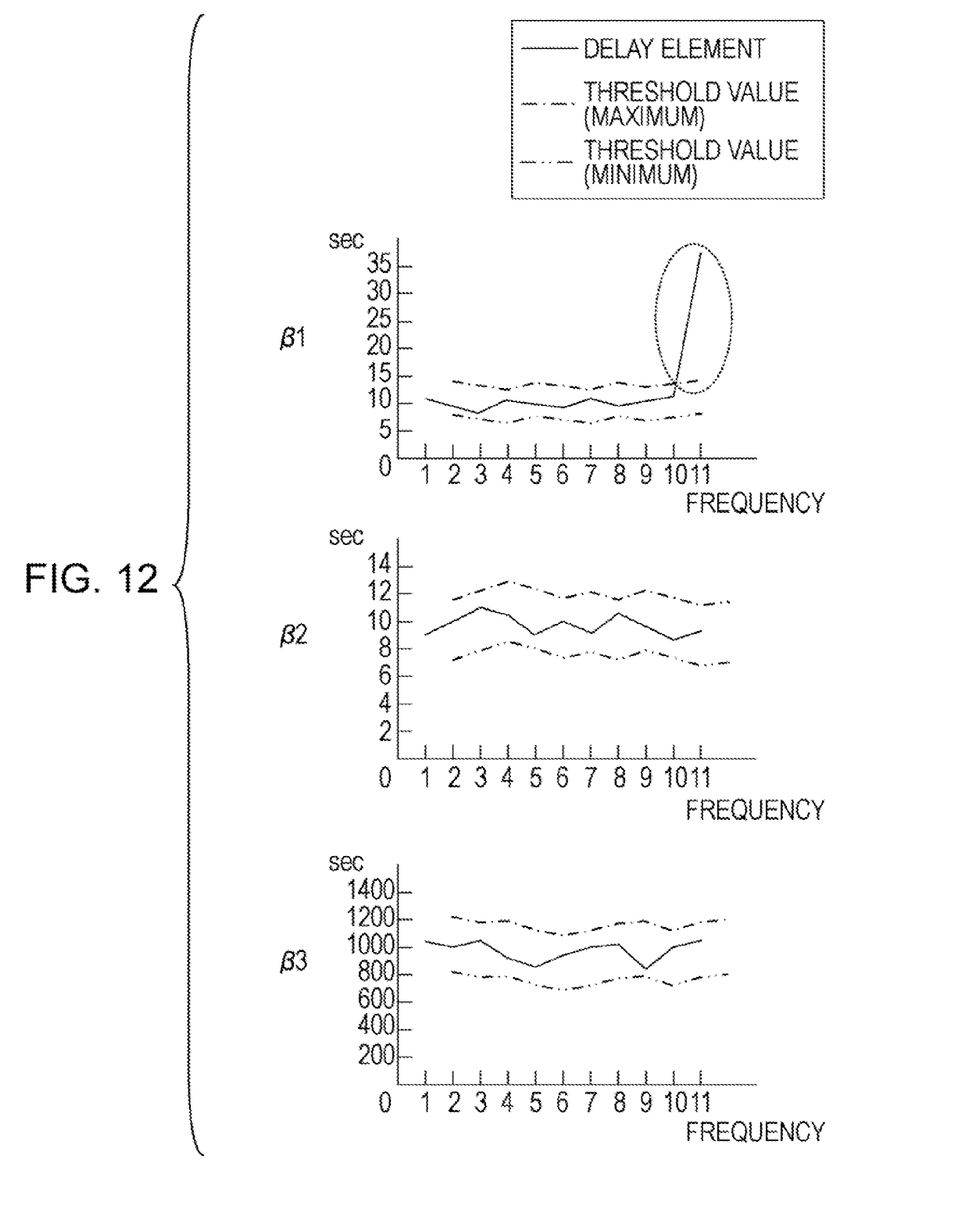
FIG. 12 illustrates threshold values that are provided for the delay elements.
Figure 13:
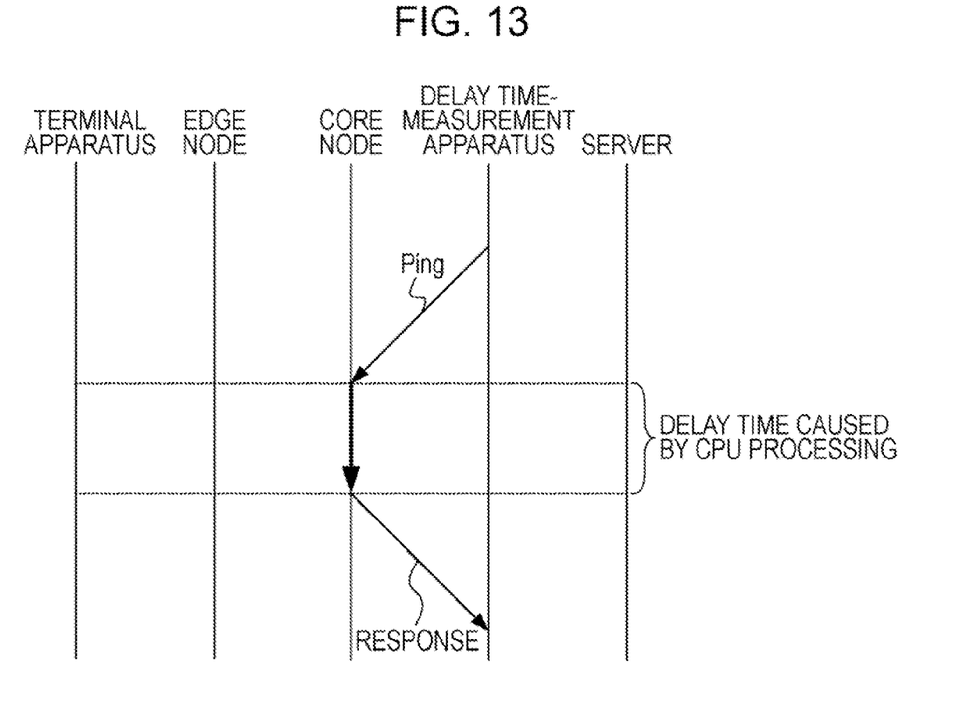
FIG. 13 illustrates an increase in the delay time, the increase being caused by the CPU processing load.

Next, the operation of the irregular node-determination processing will be described with reference to a flowchart of FIG. 10. Further, FIG. 11 indicates the method of calculating the delay element. Further, FIG. 12 illustrates threshold values that are provided for the delay elements. Further, FIG. 13 illustrates an increase in the delay time, the increase being caused by to the CPU processing load.

Figure 10:
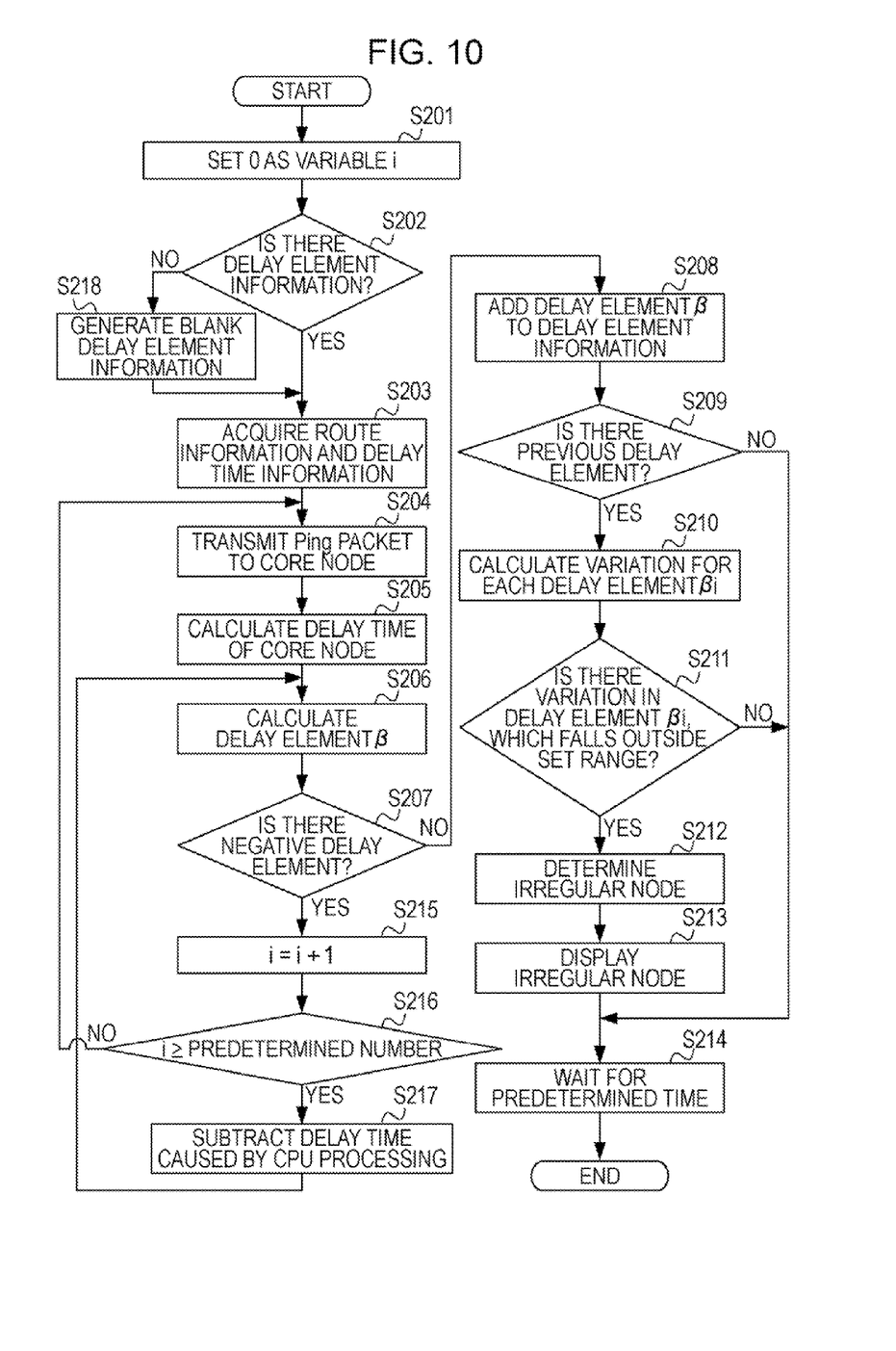
FIG. 10 is a flowchart illustrating the operation of irregular node-determination processing.

As illustrated in FIG. 10, the delay element-recording unit 26 sets 0 as a variable i at step S201, and determines whether or not the delay element information is stored in the storage unit 153 at step S202.

When the delay element information is stored in the storage unit 153, which means that the answer is YES at step S202, the delay element-calculation unit 25 acquires the route information and the delay time information from the storage unit 153 at step S203. Next, the core node-monitoring unit 24 transmits a Ping packet to the core node as an active packet at step S204, and calculates the delay time of the core node based on the Ping packet and a response transmitted from the core node to the Ping packet at step S205. More specifically, the core node-monitoring unit 24 calculates the difference between the time when the Ping packet is transmitted and the time when the response to the Ping packet is transmitted, and determines the time difference to be the delay time of the core node. Further, the core node-monitoring unit 24 transmits the Ping packet a plurality of times within a predetermined sampling time, as is the case with the calculation of the delay time of the flow, and calculates the delay time for each of the Ping packets and the responses that are transmitted thereto.

Next, the delay element-calculation unit 25 calculates the delay element based on the acquired route information and delay time information and the delay time of the core node, the delay time being calculated through the core node-monitoring unit 24 at step S206. Here, the delay element-calculation method performed through the delay element-calculation unit 25 will be described. According to equations that are illustrated in FIG. 11, the sign y1 indicates the delay time of the node N1 functioning as the core node, the sign y2 indicates the delay time of the subnet A, that is, the flow F1, and the sign y3 indicates the subnet B, that is, the flow F2. The delay element-calculation unit 25 refers to the route information, and determines the delay time y of the flow to be the sum of the delay elements of the nodes 13 via which the flow extends. In the network system according to the above-described embodiment, the delay time y2 is equivalent to $\beta_1+\beta_2$ and the delay time y3 is equivalent to $\beta_1+\beta_3$. Further, since the delay time of the core node is a delay element, the delay time y1 is equivalent to $\beta_1$. The delay element-calculation unit 25 calculates the value of $\beta_i$ used in simultaneous equations illustrating relationships that are established between the delay times and the delay elements of those flows and the core node, as a solution. Consequently, the delay element of each of the nodes 13 that are provided in the network system can be calculated. Further, the delay element-calculation unit 25 uses the multiple regression analysis to calculate the solution of each of the simultaneous equations. For example, when the delay time of each of the flows F1 and F2 is observed five times within the sampling time, and the delay time of the node N1 is observed three times within the sampling time, thirteen equations hold as illustrated in FIG. 11. In that case, the delay element-calculation unit 25 can calculate a delay element with the maximum statistical reliability from all of the thirteen equations through the multiple regression analysis. Further, the delay element-calculation unit 25 may use a different means such as quantification of class 1 to calculate the solutions of the simultaneous equations. After calculating the delay elements $\beta$, the delay element-recording unit 26 determines whether or not the value of at least one of the calculated elements $\beta$ is negative at step S207.

If it is determined that none of the calculated elements $\beta$ has a negative value, which means that the answer is NO at step S207, the delay element-recording unit 26 assigns an ID to each of the delay elements $\beta$ and adds the delay elements $\beta$ to the delay element information at step S208. Next, the variation calculation unit 27 refers to the delay element information and determines whether or not the previous delay element $\beta$, that is, a delay element $\beta$ provided with an ID of which numerical value is smaller than that of the ID assigned to the added delay element $\beta$, as much as one, had been recorded at step S209.

When the previous element $\beta$ is recorded and added to the delay element information, which means that the answer is YES at step S209, a variation in each of the added delay elements $\beta_i$ is calculated with reference to the previous delay element $\beta_i$ at step S210. Next, the irregular node-selection unit 28 determines whether or not any of the variations in the delay elements $\beta_i$ falls outside a set range at step S211. Here, the set range will be described. The set range is determined based on the delay element $\beta_i$ that is recorded and added to the delay element information. As illustrated in FIG. 12, the irregular node-selection unit 28 determines a value to be the maximum value, where the value is obtained by adding a value obtained by multiplying the value of a delay element $\beta_i$ that had been obtained before the previous delay element $\beta_i$ by a predetermined value to the value of the delay element $\beta_i$ that had been obtained before. Then, the irregular node-selection unit 28 determines a value to be the minimum value, where the value is obtained by subtracting the value obtained by multiplying the value of the delay element $\beta_i$ that had been obtained before the previous delay element $\beta_i$ by the predetermined value from the value of the delay element $\beta_i$ that had been obtained before. Consequently, threshold values are determined. Namely, the irregular node-selection unit 28 determines whether or not the delay element $\beta_i$ is irregular based on the rate of variation in the delay element $\beta_i$, where the variation rate is determined with reference to the delay element $\beta_i$ that had been obtained before the previous delay element $\beta_i$. For example, when the value of the previous delay element $\beta_i$ is 10 and the predetermined value is 0.5, the maximum value is 15 and the minimum value is 5. Further, if there is a plurality of the delay elements $\beta_i$ that had been obtained before the previous delay element $\beta_i$, the irregular node-selection unit 28 may determine the threshold values based on the average, the distribution, or time series variations in the plurality of delay elements $\beta_i$.

When any of the variations in the delay elements $\beta_i$ falls outside the set range, which means that the answer is YES at step S211, the node 13 corresponding to the variation falling outside the set range is selected and determined to be an irregular node at step S212. Next, the display unit 213 displays information about the determined irregular node on the display 156 via the output unit 155 at step S213. After the irregular node information is displayed, the wait processing unit 30 waits for a predetermined time at step S214, and finishes the irregular node-determination processing.

Further, when it is determined that none of the variations in the delay elements βi falls outside the set range at step S211, which means that the answer is NO at step S211, the wait processing unit 30 waits for the predetermined time at step S214, and finishes the irregular node-determination processing.

When the previous element β is not recorded and added to the delay element information at step S209, which means that the answer is NO at step S209, the wait processing unit 30 waits for the predetermined time at step S214, and finishes the irregular node-determination processing.

Further, if it is determined that at least one of the calculated elements β has the negative value at step S207, which means that the answer is YES at step S207, the delay element-recording unit 26 substitutes a value obtained by adding 1 to i for i at step S215. Further, the delay element-recording unit 26 determines whether or not the value of i is equal to and/or larger than a predetermined number of times the delay element calculation is retried at step S216.

When the value of i is equal to and/or larger than the predetermined number, which means that the answer is YES at step S216, the delay element-recording unit 26 subtracts the delay time of the core node, the delay time being caused by the CPU processing, from the delay time of the core node at step S217. More specifically, a value obtained by adding the maximum absolute value of the negative value of the delay element β to the value of a delay element βi prior to a delay element βi preceding the delay element βi corresponding to the maximum absolute value is subtracted from the value of the delay time of the core node, the delay time occurring in the flow including the node 13 corresponding to the negative delay element value. For example, when the value of the delay time of the node N1 is 100, that of the delay time of the flow F1 is 60, and that of the delay time of the flow F2 is 90, the equations β1=100, β2=−40, and β3=−10 hold. Here, the delay element-recording unit 26 subtracts a value obtained by adding the absolute value 40 of the delay element β2 to the value 25 of the previous delay element β2 from the delay time of the core node. Since the value of the delay time of the core node becomes 35, the equations β1=35, β2=25, and β3=55 hold. Further, a predetermined value may be set as the CPU processing time so that the predetermined value may be subtracted from the delay time of the core node.

An active packet including the Ping packet, an SNMP packet, etc. includes a program. Upon receiving the active packet, the node 13 executes the program included in the active packet. Therefore, the delay time of the node 13 may accidentally increase due to the CPU processing load, as illustrated in FIG. 13. In that case, the delay time of the flow becomes shorter than that of the core node. Therefore, the delay element-recording unit 26 can exclude the delay time caused by the CPU processing load when there is a delay element having a negative value.

Next, the delay element-calculation unit 25 calculates the delay element again based on the delay time of the core node, the delay time being corrected through the subtraction, at step S206.

Further, when the value of i is less than the predetermined number of times at step S216, which means that the answer is NO at step S216, the core node-monitoring unit 24 transmits the Ping packet again to the core node as the active packet at step S204.

Further, when it is determined that no delay element information is stored in the storage unit 153 at step S202, which means that the answer is NO at step S202, the delay element-recording unit 26 generates and stores blank delay element information in the storage unit 153 at step S218.

Thus, according to the technologies that have been disclosed in this specification, information lacking because of passive observation is augmented by monitoring the core node so that the delay time can be measured in nodes at light load during the calculation of the delay time of each of the nodes. In a network including a node branching into n once every hop number (k), the number of all of the nodes, the number being indicated by the sign Sall, is indicated as (nk+1−1)/(n−1). On the other hand, the number of at least one core node of the network, the number being indicated by the sign Score, is indicated as (nk−1)/(n−1). Therefore, compared to the case where all of the nodes are monitored, the network load can be reduced to (nk−1)/(nk+1−1) or less through the use of the technologies that have been disclosed in this specification. For example, in the case where the network according to the above-described embodiment where the number of hops that are taken to reach the client is four and the number of branches of each node is two, is used, the load put on the network becomes 3/7 (42.8%) in comparison with the case where all of the nodes are monitored. Further, when the number of branches of each node is ten, the load put on the network becomes 11/111 (9%) in comparison with the case where all of the nodes are monitored. Further, the determination whether or not the node 13 is irregular is made based on the delay time measured in nodes so that irregular nodes can be detected with increased precision.

Figure 14:
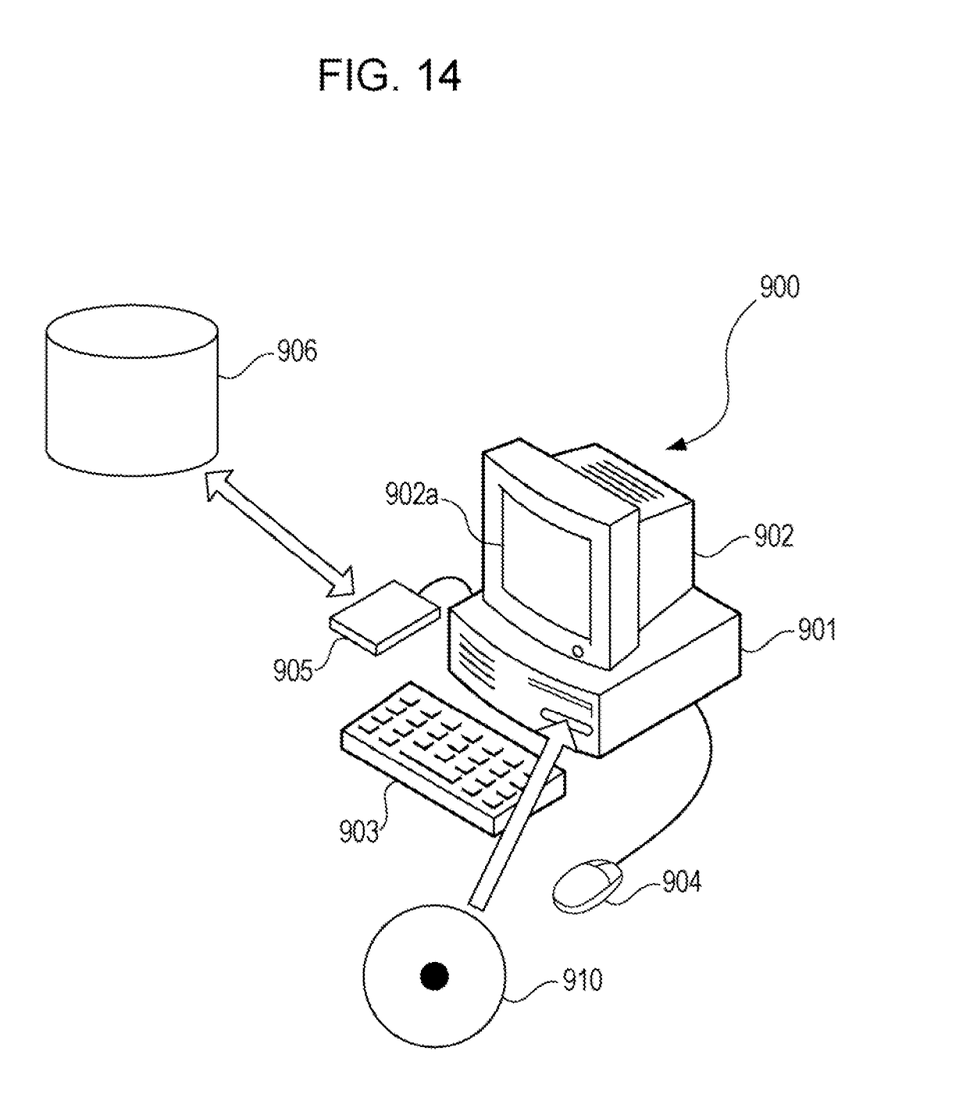
FIG. 14 illustrates an exemplary computer system achieved by using technologies that are disclosed in this specification.

The present invention can be used for the following computer system. FIG. 14 illustrates an exemplary computer system 900 achieved by using the technologies that have been disclosed in this specification. The computer system 900 includes a main body 901 including a CPU, a disk drive, etc., a display 902 displaying image data based on an instruction transmitted from the main body 901, a keyboard 903 provided to transmit various types of information to the computer system 900, a mouse 904 specifying an arbitrary position defined on a display screen 902a of the display 902, and a communication device 905 provided to access an external database or the like to download a program or the like stored in a different computer system. The communication device 905 may be a network communication card, a modem, etc.

In the above-described computer system including the delay time-measurement apparatus, a program executing the above-described steps may be provided as a delay time-measurement program. The program is stored in a recording medium that can be read through the computer system so that the computer system including the delay time-measurement apparatus can execute the program. The program provided to execute the above-described steps is stored in a portable recording medium such as a disk 910 and/or downloaded from a recording medium 906 of a different computer system through the communication device 905. Further, a delay time-measurement program (delay time-measurement software) provided to give at least a delay time-measurement function to the computer system 900 is transmitted and compiled into the computer system 900. The program makes the computer system 900 operate as a delay time-measurement apparatus having the delay time-measurement function. Further, the program may be stored in a computer-readable recording medium such as the disk 910. Here, the recording medium that can be read through the computer system 900 may be an internal storage device contained in a computer, such as a ROM, a RAM, etc., a portable storage medium including the disk 910, a flexible disk, a DVD, a magneto-optical disk, an IC card, etc., a database storing a computer program and/or a different computer system and the database thereof, and various types of recording mediums that are accessible by a computer system connected to the computer system 900 via a communication means such as the communication device 905.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A delay time measurement apparatus comprising:
a storage to store route information which indicates a connection route between a server and a terminal apparatus connected to the server via a plurality of relay nodes; and
a central processing unit to execute a process including:
determining a core node among the relay nodes on a basis of the route information, the core node being connected to the terminal apparatus via an end node, the end node being the relay node next to the terminal apparatus,
acquiring a first packet and a second packet flowing between the server and the terminal apparatus, the second packet being transmitted on a basis of the first packet,
calculating a first delay time on a basis of the first packet and the second packet, the first delay time relating to packet transmission between the server and the terminal apparatus,
transmitting a third packet to the core node,
receiving a response to the third packet from the core node,
calculating a second delay time on a basis of the third packet and the response, the second delay time being a delay time of the core node, and
calculating a third delay time on a basis of the first delay time and the second delay time, the third delay time being a delay time of the end node.

2. The delay time measurement apparatus according to claim 1, wherein the central processing unit executes repeating the process a plurality of times,
the process further includes:
storing the third delay time in the storage,
calculating a variation of the third delay time on a basis of the third delay time stored in the storage, and
comparing the variation of the third delay time with a given threshold time.

3. The delay time measurement apparatus according to claim 1, wherein
the process further includes determining whether or not the third delay time is negative,
when the third delay time is determined to be negative, the central processing unit executes an operation, in the calculating the second delay time, the operation including:
calculating a fourth delay time on a basis of the third packet and the response, the fourth delay time being a delay time of the core node, and
subtracting a processing delay time for processing the third packet in the core node from the fourth delay time to calculate the second delay time.

4. The delay time measurement apparatus according to claim 2, wherein
the threshold time is calculated on a basis of the third delay time stored in the storage.

5. The delay time measurement apparatus according to claim 1, wherein
the central processing unit executes:
repeating a first operation including:
the acquiring the first packet and the second packet, and
the calculating the first delay time on a basis of the first packet and the second packet,
storing a plurality of the first delay time calculated by the repeating the first operation in the storage,
repeating a second operation including:
the transmitting the third packet to the core node,
the receiving the responses to the third packet, and
the calculating the second delay time on a basis of the third packet and the response,
storing a plurality of the second delay time calculated by the repeating the second process in the storage, and
calculating the third delay time on a basis of the plurality of the first delay times and the plurality of the second delay times through the multiple regression analysis.

6. A non-transitory computer readable storage medium storing a delay time measurement program for causing a computer to execute a process comprising: determining a core node among a plurality of relay nodes on a basis of route information stored in a storage, the route information indicating a connection route between a server and a terminal apparatus connected to the server via the relay nodes, the core node being connected to the terminal apparatuses via an end node, the end node being the relay node next to the terminal apparatus; acquiring a first packet and a second packet flowing between the server and the terminal apparatus, the second packet being transmitted on a basis of the first packet; calculating a first delay time on a basis of the first packet and the second packet, the first delay time relating to packet transmission between the server and the terminal apparatus; transmitting a third packet to the core node; receiving a response to the third packet from the core node; calculating a second delay time on a basis of the third packet and the response, the second delay time being a delay time of the core node; and calculating a third delay time on a basis of the first delay time and the second delay time, the third delay time being a delay time of the end node.

7. The non-transitory computer readable storage medium according to claim 6, wherein the program causes the computer to execute repeating the process a plurality of times, the process further includes: storing the third delay time in the storage; calculating a variation of the third delay time on a basis of the third delay time stored in the storage; and comparing the variation of the third delay time with a given threshold time.

8. The non-transitory computer readable storage medium according to claim 6, wherein the process further includes determining whether or not the third delay time is negative, when the third delay time is determined to be negative, the program causes the computer to execute an operation, in the calculating the second delay time, the operation including: calculating a fourth delay time on a basis of the third packet and the response, the fourth delay time being a delay time of and the core node, and subtracting a processing delay time for processing the third packet in the core node from the fourth delay time to calculate the second delay time.

9. The non-transitory computer readable storage medium according to claim 7, wherein the threshold time is calculated on a basis of the third delay time stored in the storage.

10. The non-transitory computer readable storage medium according to claim 6, wherein the program causes the computer to execute: repeating a first operation including: the acquiring the first packet and the second packet, and the calculating the first delay time on a basis of the first packet and the second packet, storing a plurality of the first delay time calculated by the repeating the first operation in the storage, repeating a second operation including: the transmitting the third packet to the core node, the receiving the responses to the third packet, and the calculating the second delay time on a basis of the third packet and the response, storing a plurality of the second delay time calculated by the repeating the second process in the storage, and calculating the third delay time on a basis of the plurality of the first delay times and the plurality of the second delay times through the multiple regression analysis.

11. A network system comprising:
a server;
a terminal apparatus;
a plurality of relay nodes connected between the server and the terminal; and
a delay time measurement apparatus for measuring a delay time of each of the relay nodes; wherein
the delay time measurement apparatus comprises:
a storage to store route information which indicates a connection route between a server and a terminal apparatus connected to the server via a plurality of relay nodes, and
a central processing unit to execute a process including:
determining a core node among the relay nodes on a basis of the route information, the core node being connected to the terminal apparatus via an end node, the end node being the relay node next to the terminal apparatus,
acquiring a first packet and a second packet flowing between the server and the terminal apparatus, the second packet being transmitted on a basis of the first packet,
calculating a first delay time on a basis of the first packet and the second packet, the first delay time relating to packet transmission between the server and the terminal apparatus,
transmitting a third packet to the core node,
receiving a response to the third packet from the core node,
calculating a second delay time on a basis of the third packet and the response, the second delay time being a delay time of the core node, and
calculating a third delay time on a basis of the first delay time and the second delay time, the third delay time being a delay time of the end node.

12. The network system according to claim 11, wherein
the central processing unit executes repeating the process a plurality of times,
the process further includes:
storing the third delay time in the storage,
calculating a variation of the third delay time on a basis of the third delay time stored in the storage, and
comparing the variation of the third delay time with a given threshold time.

13. The delay time measurement apparatus according to claim 11, wherein
the process further includes determining whether or not the third delay time is negative,
when the third delay time is determined to be negative, the central processing unit executes an operation, in the calculating the second delay time, the operation including:
calculating a fourth delay time on a basis of the third packet and the response, the fourth delay time being a delay time of the core node, and
subtracting a processing delay time for processing the third packet in the core node from the fourth delay time to calculate the second delay time.

14. The delay time measurement apparatus according to claim 12, wherein
the threshold time is calculated on a basis of the third delay time stored in the storage.

15. The delay time measurement apparatus according to claim 11, wherein
the central processing unit executes:
repeating a first operation including:
the acquiring the first packet and the second packet, and
the calculating the first delay time on a basis of the first packet and the second packet,
storing a plurality of the first delay time calculated by the repeating the first operation in the storage,
repeating a second operation including:
the transmitting the third packet to the core node,
the receiving the responses to the third packet, and
the calculating the second delay time on a basis of the third packet and the response,
storing a plurality of the second delay time calculated by the repeating the second process in the storage, and
calculating the third delay time on a basis of the plurality of the first delay times and the plurality of the second delay times through the multiple regression analysis.

* * * * *